United States Patent Office 3,435,080
Patented Mar. 25, 1969

3,435,080
CYCLIZATION REACTION AND VINYL-CYCLOPENTANE DERIVATIVES
El-Ahmadi I. Heiba, Princeton, and Ralph M. Dessau, Highland Park, N.J., assignors to Mobil Oil Corporation, a corporation of New York
No Drawing. Filed Jan. 6, 1966, Ser. No. 518,989
Int. Cl. C07c *17/32, 21/06, 17/28*
U.S. Cl. 260—648     7 Claims

ABSTRACT OF THE DISCLOSURE

Vinylcyclopentane derivatives, including certain novel dihalogenated compounds exemplified by 1,1-dichloro-2-(2-methyl-cyclopentyl)-ethylene, are obtained by reacting certain long-chain acetylenes, such as heptyne-1, with a free radical donor, such as carbon tetrachloride, using a free radical catalyst or radiation to produce a rearrangement and cyclization of the carbon chain of the acetylene reactant.

---

This invention relates to a novel method for the cyclization of a substituent on certain substituted acetylenes and also to certain novel compounds which may be prepared by the process.

It has been found that certain acetylenic compounds which have a substituent in the form of a carbon chain containing at least 4 carbon atoms are subject to rearrangement and cyclization of the carbon chain by a free radical addition to convert the acetylenic group to an olefinic radical, a 6-2 shift of a single hydrogen atom and ring closure. The aforesaid free radical addition, unlike normal additions to a triple bond, renders the addition intermediate susceptible to the isomerization of the hydrogen shift. Ring closure involves only the carbons in the 2 and 6 positions for only one of the two carbons in the original acetylenic radical enters the ring; therefore, there is an unsatisfied valence bond remaining attached to the number 1 carbon atom. Various techniques may be employed in satisfying this valence bond, as exemplified by dimerization, addition of another free radical, disproportionation or by splitting off a portion of the free radical in forming a vinyl side chain on the cycloaliphatic ring. Certain new dihalogenated vinylcyclopentane derivatives are among the products obtainable from the last-mentioned reaction.

The present invention accordingly concerns a process which comprises reacting (A) an acetylenic compound having an organic substituent containing at least 4 carbon atoms in a chain with at least one hydrogen atom attached to a carbon atom in said chain, said carbon atom being linked through 3 carbon atoms in said chain to the acetylenic group, with (B) a free radical donor under conditions conducive to free radical formation to add a free radical to said acetylenic compound thereby converting said acetylenic group into an olefinic radical, shifting said hydrogen atom to said olefinic radical and forming a five-carbon ring by the linkage of the two carbon atoms involved in said hydrogen shift. The carbon chain of said organic substituent need not be a straight chain so long as there is at least one hydrogen atom on the carbon in the 6 position, i.e., the fourth carbon removed from the acetylene radical. For example, said organic substituent may be either a substituted or unsubstituted alkyl, cycloalkyl, alkaryl or aralkyl radical. Alkyl-substituted acetylenes have provided good results and halogenated hydrocarbons are suitable free radical donors.

Other aspects of the novel process relate to splitting of a portion of certain free radicals from the addition product to form a vinylcyclopentane derivative and specific reactants and catalyst.

This invention also relates to certain new compositions of matter which may be obtained by the aforesaid process in the form of dihalogenated vinylcyclopentane compounds having the general formula:

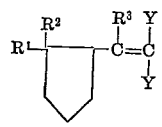

wherein $R^1$, $R^2$, and $R^3$ are individually selected from the group consisting of hydrogen and alkyl, cycloalkyl, aryl, aralkyl, and alkaryl radicals and Y represents a halogen atom of the group consisting of chlorine, bromine, and iodine atoms. Specific examples of such novel compounds include 1, 1-dichloro-2-(2-methyl-cyclopentyl)-ethylene wherein $R^1$ is a methyl radical, $R^2$ and $R^3$ are hydrogen atoms and each Y is a chlorine atom in this formula and 1,1-dichloro-2-(2,2-dimethyl-cyclopentyl)-ethylene in which $R^1$ and $R^2$ are methyl radicals, $R^3$ is a hydrogen atom and each Y is a chlorine atom. Both substances are colorless, free flowing liquids with high boiling points. The new compounds are generally useful in fungicidal and insecticidal compositions and in synthetic resins, for example, as comonomers for copolymerization with certain other unsaturated monomers, as illustrated by styrene, methylmethacrylate and acrylonitrile.

While the instant invention should not be regarded as bound to any particular theory, it is thought that the present process may be described by sequential reactions which include those designated by the following equations:

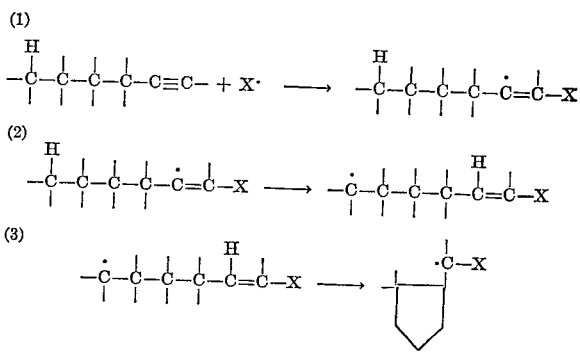

wherein X· represents said free radical and the dot denotes an unsatisfied valence bond.

The substituted acetylenic starting material in Equation 1 has a substituent which is not necessarily an aliphatic chain radical but may also include a portion of a cycloaliphatic or aromatic ring. The dangling bonds of this reactant may be linked to a variety of atoms or radicals which will not interfere with the addition, isomerization and cyclization reactions involved here. Accordingly, these substituents may include hydrogen, chlorine, or hydrocarbon residues such as substituted or unsubstituted ethyl, cyclopropyl or phenyl groups.

The cyclopentane product shown in Equation 3 is not a final product as it has an unsatisfied valence bond designated by the dot on the carbon atom. This intermediate is further reacted in at least one more reaction depending on its composition and the reaction conditions.

When carbon tetrachloride is present in excess as the free radical donor, the free radical is ·CCl₃ and the product of Equation 3 is vinylized with a splitting off of a free chlorine atom according to the following equation:

(4) 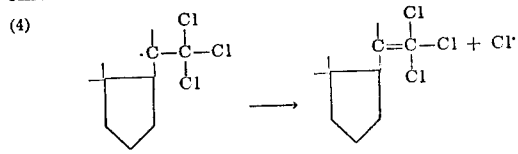

It is contemplated that bromine, iodine and organic sulfide radicals may be similarly split off in a vinylation reaction of this type. Such organic sulfide groups may be described as —SR groups wherein R represents an alkyl, aryl, alkaryl or aralkyl radical.

On the other hand, when conditions favor dimerization, as for instance, in using an inert reaction solvent and a minimum quantity of a free radical donor other than one having an alpha-bromo or an alpha-chloro radical, the following reaction may be postulated:

(5) 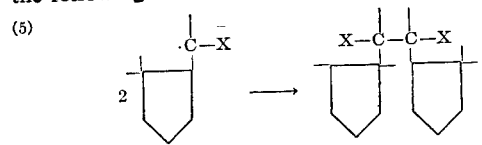

In situations where a hydrocarbon radical is attached to the same carbon atom which has the unsatisfied valence bond, another possible reaction is disproportionation, as illustrated by the following equation:

(6) 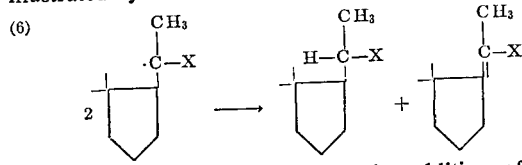

A further possible reaction is the addition of a free radical A to the product of Equation 3 and this free radical may be the same as radical X or a different free radical may be introduced into the reaction mixture. The following equation is illustrative:

(7) 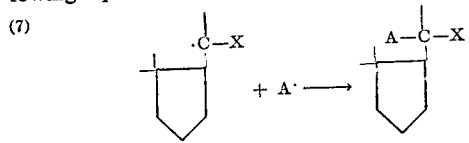

A large number of substituted acetylenic compounds may be used as starting materials in the process of this invention, and these may be designated by the following general formula:

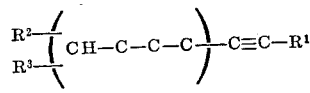

In which $R^1$, $R^2$, and $R^3$ may be like or different substituents selected from the group comprising hydrogen atoms, and substituted or unsubstituted alkyl, cycloalkyl, aryl, aralkyl, and alkaryl radicals. The bracketed moiety of this compound may be either a straight chain or a cyclic radical or a combination of the two. In the case of a cyclic radical, a fused structure containing at least 2 rings will be produced by the new method.

A great many substituted acetylenes may be used as reactants in the novel process with the provision that they have a hydrogen atom on the number 6 carbon relative to the acetylenic radical and these include, inter alia, hexyne-1, heptyne-1, octyne-1, 6-methyl-heptyne-1, 6-phenyl-heptyne-1, 3-methyl or 4-methyl or 5-methyl-heptyne-1, 5,5-difluoro-heptyne-1, cyclododecyne-1, ethynyl-cyclohexane, and o-propyl-phenylacetylene. In general, it is desirable to select a starting material which is devoid of nonbenzenoid unsaturation except for the single acetylene radical involved in the reaction described herein in order to minimize any tendency toward side reactions.

Also, it is generally preferable to have a hydrogen atom as $R^1$ in Formula 8 in order to direct the free radical addition to the carbon atom in the 1-position rather than have it distributed on the carbon atoms in both the 1 and 2-positions, counting from right to left in Formula 8.

Among the suitable free radical donors for this addition-rearrangement process are halogenated hydrocarbons, as exemplified by carbon tetrachloride and chloroform; methyl bromoacetate; bromoacetonitrile; diethyl malonate organic disulfides, such as, methyl, ethyl, isopropyl, phenyl, and tertiary-butyl disulfides; and also aliphatic alcohols, aldehydes and amines, such as isopropanol, n-butyraldehyde and cyclohexylamine, respectively.

The instant process may be desirably carried out with the acetylenic compound dissolved in a reaction solvent. In some cases this solvent may be the free radical donor, and in others it may be an inert medium, such as benzene, chlorobenzene, acetonitrile, tetrachloroethylene, acetic acid, and various fluorinated hydrocarbons.

The method of this invention is performed under conditions conducive to free radical formation, such as the presence of a free radical catalyst or with the reaction mixture exposed to strong ultraviolet radiation or ionizing radiation, such as gamma-rays or X-rays. Among the many suitable catalysts are organic peroxides, such as benzoyl peroxide and acetyl peroxide, etc.; peresters, as illustrated by tertiary-butyl perbenzoate, and peroxy carbonates, such as di-tertiary-butyl diperoxy-carbonate.

Reactions of the type described herein are usually favored by the use of elevated temperatures, even though many such reactions may be carried out at room temperature or lower. Temperatures of the order of 50 to 150° C. are suitable in many cases. The optimum temperature usually differs for different reactants, and this temperature is generally best determined by trial for any particular reaction mixture. In some instances, it is desirable to heat the mixture to the reflux temperature of the solvent medium under atmospheric pressure.

These reactions may also be promoted in certain cases by adjusting the concentration of the reaction solvent customarily employed. With an inert reaction solvent, a substantial excess of solvent over that required to dissolve the reactants is usually desirable since dilution promotes the formation of the rearranged product. On the other hand, when the reaction solvent is a free radical donor, the yield is often improved by restricting the amount of solvent to little or no excess over that required by stoichiometry and for dissolving the reactant.

The process of this invention desirably carried out under an inert atmosphere, such as a blanket of nitrogen, to avoid uncontrolled oxidative side reactions. The nitrogen may be passed through the reaction vessel as a slow stream.

Recovery of the reaction products may be obtained by conventional techniques, such as distillation, using reduced pressure where necessary or desirable.

The results of the present process are surprising in that substantial yields of the desired product are obtained despite the normal tendency of addition reactions involving an acetylene group to add a radical to both of the triply bonded carbon atoms and thus block a hydrogen shift of the type which apparently occurs here.

For a better understanding of the nature and objects of this invention, reference should be had to the accompanying illustrative examples wherein all temperatures are expressed in ° C., all proportions in terms of weight unless otherwise stated, and the yields are not regarded as optimal.

EXAMPLE 1

A quantity of heptyne-1 amounting to 50 grams is dissolved in 1000 g. of carbon tetrachloride. This solution is poured into a glass flask equipped with a reflux condenser and also an inlet for nitrogen or another inert gas. A slow stream of nitrogen gas is passed through the vessel during the entire reaction. The reaction is started by heating the reaction mixture and adding 1.0 g. of benzoyl peroxide as a free radical catalyst. After reaching the reflux temperature of 77° C., the mixture is refluxed for a period of 24 hours until most of the heptyne-1 is reacted. Distillation is employed to separated the desired product, 1,1-dichloro-2-(2-methyl-cyclopentyl)-ethylene, which boils at a temperature of 77-80° C./10.5 mm. Hg (absolute), from two straight chain by-products, namely, a substantial quantity of the normal carbon tetrachloride addition product and a much smaller amount of $Cl_2$ addition product. The yield amounts to 25 g. or 25% of theory and the structure of this rather mobile, colorless liquid product is established as

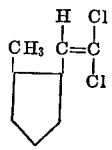

in cis- and trans-isomeric form by the analytical procedures described hereinafter.

This cyclic product consists of two isomers in about 2:1 ratio as determined by vapor phase chromatography. The nuclear magnetic resonance spectrum of the major isomer shows a doublet at 4.35 tau (J=9.7 c.p.s., 1.0 h.), a multiplet at 7.2 tau (1.0 h.), broad absorption in the 7.8-8.8 tau region (7.2 h.), and another doublet at 9.2 tau (J=6.5 c.p.s., 2.9 h.). The other isomer has its low field doublet displaced to 4.43 tau (J=9.1 c.p.s.). The infrared spectrum of each isomer contains a sharp band at 1618 cm.$^{-1}$, indicative of a —C=CCl$_2$ linkage. Calculated chemical analysis of the isomer mixture of $C_8H_{12}Cl_2$ is C=53.63 and H=6.76 and found amounts to C=53.98 and H=6.97. Low voltage mass spectra indicate a parent peak at m./e.=178 containing two chlorine atoms, despite extensive fragmentation.

The skeletal structure of the rearranged product is confirmed by quantitative hydrogenation of the isomer mixture, in the presence of Raney Ni and alcoholic potassium hydroxide to a mixture of cis- and trans-1-methyl-2-ethylcyclopentane, with the cis isomer predominating. The vapor phase chromatography retention times of these products (M.W. 112) are identical to those of authentic samples.

EXAMPLE 2

The procedure of Example 1 is repeated exactly except for the substitution of 55 g. of 6-methylheptyne-1 as the starting material in place of the unsubstituted heptyne of Example 1. After refluxing the reaction mixture for 24 hours, a product with a boiling point of 86-89° C./10 mm. Hg amounting to 29.5 g. or 30% of theory is obtained by distillation. Upon analysis, this product is found to be 1,1-dichloro-2-(2,2-dimethyl-cyclopentyl)-ethylene. Its nuclear magnetic resonance spectrum contains a doublet at 4.3 tau (J=9.7 c.p.s., 1 h.), as well as two singlets at 9.0 tau (3 h.) and 9.2 tau (3 h.), in addition to broad absorption in the 7.3-8.8 tau region.

Other experimentation indicates the yield of cyclic product in Examples 1 and 2 can be improved substantially by reducing the concentration of carbon tetrachloride employed in the examples and/or by raising the reaction temperature.

Upon observing the results of Examples 1 and 2, it may be postulated that a free ·CCl$_3$ radical derived from the carbon tetrachloride is attached by addition to the number 1 carbon of the heptyne-1 (or its methyl derivative) leaving an unsatisfied valence bond attached to the number 2 carbon atom of the resulting heptene-1. Then a shift of the hydrogen atom from the number 6 carbon atom to the number 2 position and cyclization occur to yield an intermediate cyclopentane derivative which has an unsatisfied valence bond on the carbon atom originally in the 2-position and now attached directly to a nuclear carbon atom. This intermediate evidently further reacts under the conditions of these examples by splitting out a free chlorine atom thereby satisfying the valence bonds by formation of a chlorovinyl group as indicated in Equation 4 hereinbefore.

Further experimentation indicates there is a 10:1 preference for intramolecular 2,6-abstraction of tertiary hydrogen (e.g., using 6-methylheptyne-1) over secondary hydrogen (e.g., heptyne-1) by the secondary vinyl radical in Equation 2 hereinbefore. This is attributed to the fact that a tertiary hydrogen is more labile than a secondary hydrogen atom and therefore has a greater tendency to migrate in a molecular rearrangement reaction.

EXAMPLE 3

The procedure of Example 1 is repeated except for the substitution of 1000 g. of chloroform in place of the carbon tetrachloride. After refluxing for 24 hours, distillation is employed to isolate the desired product, 1,1-dichloro-2-(2-methyl-cyclopentyl)-ethylene in a yield amounting to 27 g.

While the process of this invention has been described in considerable detail hereinabove, especially in the illustrative examples and naming of a number of other reactants, catalysts, etc., it will be readily apparent to those skilled in the art that many other embodiments and modifications of the process fall within the purview of this invention. Accordingly, the instant invention should not be regarded as limited in any particulars except as may be recited in the appended claims or required by the prior art.

We claim:

1. A compound having the following general formula:

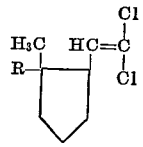

wherein R is a member of the group consisting of a methyl radical and a hydrogen atom.

2. A compound according to claim 1 in which R represents a hydrogen atom.

3. A compound according to claim 1 in which R represents a methyl radical.

4. A process which comprises reacting heptyne-1 with carbon tetrachloride at temperatures between room temperature and 150° C. in the presence of a free radical catalyst and thereafter separating from the reaction mixture a compound having the following structure:

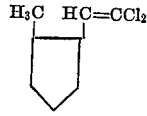

5. A process according to claim 4 in which said free radical catalyst is benzoyl peroxide.

6. A process which comprises reacting 6-methyl-heptyne-1 with carbon tetrachloride at temperatures between room temperature and 150° C. in the presence of a free radical catalyst and thereafter separating from the reaction mixture a compound having the following structure:

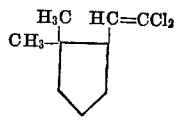

7. A process according to claim 6 in which said free radical catalyst is benzoyl peroxide.

References Cited

UNITED STATES PATENTS 2,042,223 5/1936 Groll _____ 260—651
2,468,208 4/1949 Kharasch.

OTHER REFERENCES

Kharasch et al.: J. Org. Chem., vol. 15, pp. 966–972 (1950).

LEON ZITVER, *Primary Examiner.*

MATTHEW M. JACOB, *Assistant Examiner.*

U.S. Cl. X.R.

167—30; 204—163; 260—45.7, 85.5, 86.1, 87.5, 649